April 28, 1964   B. G. BENAWAY   3,130,747
FLOW REGULATOR
Filed May 15, 1961
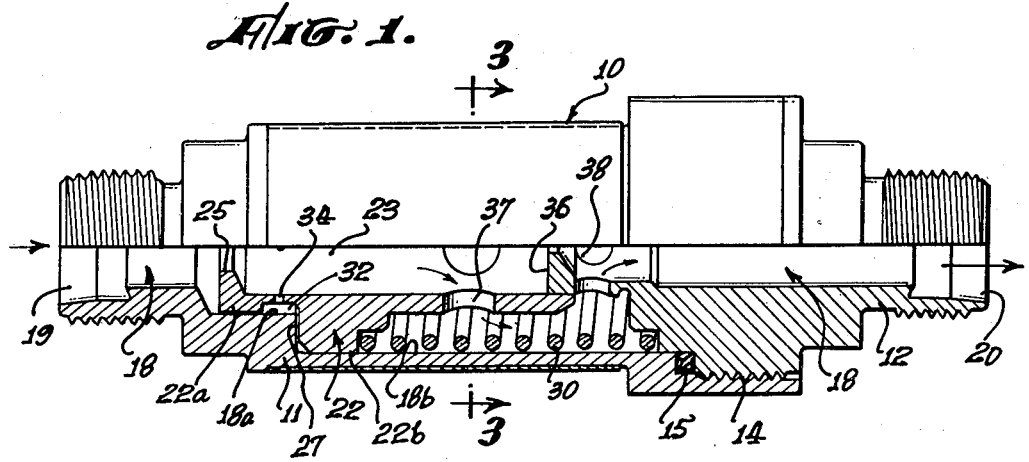
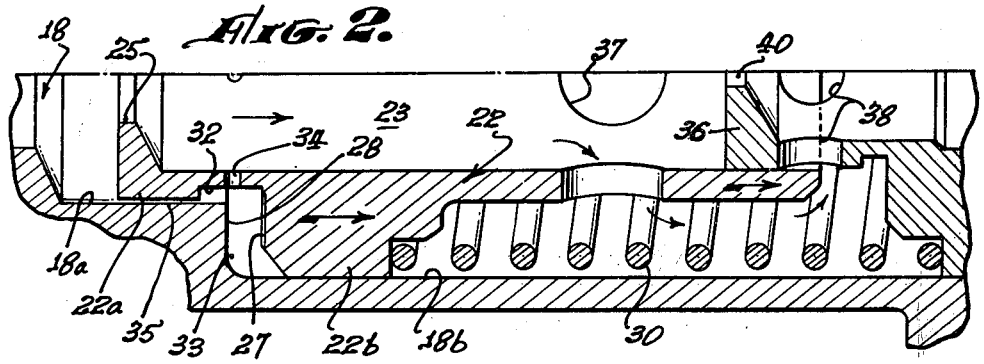
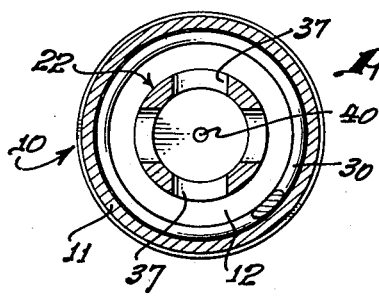
BERNARD G. BENAWAY,
INVENTOR.
BY *Knight & Rodgers*
ATTORNEYS.

United States Patent Office 3,130,747
Patented Apr. 28, 1964

3,130,747
FLOW REGULATOR
Bernard G. Benaway, Granada Hills, Calif., assignor to Sterer Engineering and Manufacturing Company, North Hollywood, Calif., a corporation of California
Filed May 15, 1961, Ser. No. 110,029
13 Claims. (Cl. 137—504)

The present invention relates generally to flow regulating devices, and more especially to one designed to compensate for changes in viscosity occurring with temperature changes in order to have a nearly constant rate of flow of a liquid through a conduit over a wide range of temperatures.

While the present invention is not limited in any way by the use to which it is put, as an example of such uses there may be mentioned use of a flow regulator in a hydraulic system for aircraft. The aircraft is subjected to a wide range of ambient temperatures, including those temperature changes due to seasonal conditions or to altitude changes. The change in temperature changes the viscosity of the hydraulic fluid in the system and this in turn results in a change in the rate of flow through a regulator for a given unit pressure applied to the hydraulic fluid. Under some circumstances, the purpose of the flow regulator may be to maintain a substantially constant flow rate to compensate for the effects of heat developed internally within a hydraulic system, such heat having a tendency to reduce the viscosity of the working medium. Conversely, it may compensate for an increase in viscosity created by a low ambient temperature.

Hence it is a general object of my invention to provide a flow regulator designed to produce a substantially constant rate of liquid flow through the regulator over a wide range of temperatures.

A further object of the invention is to provide a flow regulator of novel design adapted to provide automatic compensation for a change in viscosity due to a change in temperature, thus maintaining closely a given flow rate independent of the fluid viscosity.

These objects are accomplished in a flow regulator constructed according to my invention by providing a body having an internal bore extending through the body to provide spaced fluid inlet and outlet openings preferably at opposite ends of the body to produce an in-line unit. A piston member is slidable within the bore and has a longitudinally extending fluid passage, said piston having at one end means creating a fluid pressure differential on the piston that urges the piston in the direction of fluid flow. Such means may be typically a sharp-edged orifice. Biasing the piston in opposition to this fluid pressure differential is a resilient means, typically a spring urging the piston in a direction opposite to fluid flow within the body. Valve means, including a fluid port and means adapted to restrict flow through said port, are provided to operate in response to movement of the piston to control fluid flow through the body.

The total area on the piston subjected to fluid pressure urging the piston in the direction of fluid flow is divided into two separate areas. One of these areas is subjected to a variable fluid pressure that is modified by a change in fluid viscosity. Means for bringing about the modification in pressure includes a pair of fluid passages of such shapes that fluid flow through one varies much more with viscosity changes than flow through the other. These passages both communicate with the space containing fluid exerting pressure at said one area and extend respectively to points upstream and downstream of the means creating the pressure differential on the piston.

How the above objects and advantages of my invention, as well as others not specifically referred to herein, are attained will be better understood by reference to the following description and the annexed drawing in which:

FIG. 1 is a combined elevation and longitudinal median section through a flow regulator constructed according to my invention.

FIG. 2 is an enlarged portion of the regulator shown in median section with the piston member in position to partially restrict flow through the valve port.

FIG. 3 is a transverse section on line 3—3 of FIG. 1.

Referring now to the drawing, and particularly to FIG. 1 it will be seen that the body, indicated generally at 10, is made in two pieces 11 and 12 which are joined together by a screw thread 14. It is preferred to provide an oil seal 15 in the joint between the body sections in order to prevent leakage of the hydraulic fluid at higher pressures. The body is made in two parts for ease in machining and assembly but it will be realized that the invention is not necessarily limited to the specific shape here shown for each of these two parts 11 and 12.

The body is provided internally with a longitudinally extending fluid passage indicated generally at 18 and a portion of which forms a differential bore consisting of two sections 18a and 18b in body section 11. The passage 18 extends entirely through the body, thus providing communication between inlet opening 19 at one end and outlet opening 20 at the other end of the body. The body is provided with suitable means, such as external threads, for attaching fluid conduits to the body at inlet 19 and outlet 20. This in-line arrangement is preferred with inlet 19 and outlet 20 co-axial; but it is within the scope of the invention to have one or both of openings 19 and 20 at the side of the body.

Within the differential bore and slidable longitudinally thereof is differential piston member 22. Piston 22 may be characterized as a differential piston since it has a portion 22a of small diameter and a portion 22b of large diameter contained respectively within sections 18a and 18b of the bore. The piston is hollow providing a longitudinally extending fluid passage 23. At the inlet end of piston 22 is a sharp-edged orifice 25 through which fluid flows, entering from the space upstream from the piston and then flowing into the main fluid passage 23 within the piston.

The ratio of diameters of piston sections 22b and 22a is of importance in securing proper operation. For most hydraulic fluids used in aircraft control systems a ratio of the diameter of piston section 22a to the diameter of section 22b of about 3:1 is most satisfactory. A range of about 2.5:1 to about 3.5:1 covers all ordinarily encountered situations and outside this range of ratios the forces on the small end of the piston and on the annular area of shoulder 27 are not properly balanced for best results.

Between the small and large diameter sections, the piston has an annular shoulder 27 which is opposite to a similar annular shoulder 28 on the body between bore sections 18a and 18b. Travel of the piston toward the inlet end 19 of the body is limited by engagement of the shoulders. Travel of the piston in this direction is a result of the force applied to the piston by spring 30 which serves as a resilient means for biasing the piston in a direction opposite to forces on the piston applied by the main fluid flow through the body from inlet 19 to outlet 20.

Adjoining shoulder 27, the body is provided with an annular groove 32. At groove 32 the piston member is provided with port 34 which communicates between the internal passage 23 of the piston and the annular chamber 33 outside of the piston between shoulders 27 and 28. Groove 32 is provided chiefly as a means of preventing port 34 from being sealed off by the wall of bore 18a when the piston is in the position of FIG. 1.

Whereas port 34 places the annular chamber 33 in communication with the downstream side of orifice 25, communication with the upstream side of orifice 25 is provided by the annular clearance 35 between the periphery of small piston section 22a and the wall of bore section 18a. The clearance here is small, being typically about 0.004 in. but this may be varied within a range of 0.002–0.006 in. according to the viscosity of the fluid handled and the operating characteristics desired. This passage is very narrow; but because of its dimension measured around the circumference of the piston, its total area is significant, being normally 5 to 10 times the total area of port 34. Annular clearance at 35 is a convenient and practical way to provide a fluid passage having the desired physical shape and flow characteristics; but it is to be realized that the invention is not necessarily so limited.

Because passage 35 is narrow (radial dimension) and relatively long, it has the flow characteristics of a tube and the rate of fluid flow through it is very responsive to viscosity of the fluid. This is especially marked in the case of high viscosity fluids which flow with great resistance through a long narrow passage, such as a tube, having the shape and flow characteristics of the passage 35. On the other hand orifice 34 passes the hydraulic fluid much more easily and flow here is influenced relatively little by the viscosity of the fluid because of the shape of the orifice.

The clearance between large piston section 22b and the surrounding body wall is less than at 35 being of the order of 0.001 inch or less so that little or no fluid by-passes the piston at this point. Consequently, all the flow through passage 35 into chamber 33 may, for practical purposes, be considered to pass also through port 34.

Body member 12 is provided at its inner end with centrally located pilot or post 36 which enters fluid passage 23 of the piston and is engaged externally by a skirt or sleeve on the piston. This engagement supports and guides the piston as it moves longitudinally within the body. Pilot 36 also provides a part of the valve means regulating fluid flow. The piston has a plurality of openings 37 provided in the wall of the piston which at the location of these openings is spaced from the wall of body section 11; and the main fluid flow is out of passage 23 through openings 37 and then into pilot 36 through one or more valve ports 38.

These openings 38 are located within the range of movement of the sleeve end of piston 22 so that movement of the piston towards the outlet end of the body covers fluid ports 38 to a greater or lesser extent, as shown in FIG. 2, thus effecting a restriction upon the main flow of fluid between inlet 19 and outlet 20. In order to permit at all times some flow of fluid and prevent flow from being entirely blocked by the piston covering ports 38, pilot 36 such as might occur if spring 30 broke in two is provided with a small central port 40 which allows limited flow of fluid through the regulator at all times. Port 40 is a fail-safe device required by user's specifications and has no essential bearing on the operation of the regulator. Accordingly, it may be omitted if desired.

Having described the construction of temperature compensated flow regulator, I shall now describe briefly its operation.

The main flow is generally axially through the regulator from inlet 19 through orifice 25, passage 23 and openings 37 into the body space outside the piston. The flow is then into pilot 36 through valve ports 38 at which point flow is regulated by the sleeve on the piston covering more or less of the total area of ports 38. Finally fluid leaves the regulator through outlet 20.

As fluid flows through orifice 25, a pressure drop across the orifice is created. The differential pressure thus created is applied to the annular face of the inlet end of piston 22 and another but not equal fluid pressure is applied to the annular face of shoulder 27. The total of these forces moves the piston in the direction of fluid flow against spring 30. This piston movement restricts the main flow at ports 38. As conditions change so that the flow rate tends to rise, the forces on the piston move the piston so that the restriction at ports 38 is increased. As conditions change oppositely, the converse action takes place and the restriction to flow at ports 38 is decreased. Hence a balance of conditions is maintained that keeps the total flow rate substantially at a predetermined constant value.

There is also a secondary fluid flow that is used here to achieve a temperature compensation by changing the total regulation of flow in a manner responsive to viscosity changes. This secondary flow is through annular passage 35 into the annular chamber 33. The fluid pressure in this chamber exerts a force on the area of annular shoulder 27 that is in the direction of fluid flow through the regulator and so adds to the regulating force as described above. The entry of fluid into chamber 33 is from a point upstream of orifice 25 through annular passage 35 which has a shape such that flow through it changes sharply with a change in viscosity. Fluid is discharged from chamber 33 through port 34 into the main stream at a point downstream from orifice 25 which has a shape such that fluid flow through it is comparatively independent of the viscosity of the fluid. Fluid pressure in chamber 33 is always greater than in passage 23 but the difference in pressure across port 34 is established by the flow into chamber 33 since port 34 is large enough—about $\frac{1}{32}''$ diameter—to accept easily all the liquid reaching annular chamber 33.

With a relatively thin or low viscosity fluid a relatively large quantity flows through passage 35 into annular chamber 33, creating a relatively high pressure drop across orifice 34. This means fluid pressure in annular chamber 33 is comparatively high with respect to pressure in passage 23 and the force on the piston is likewise high. This force adds to the force on the small diameter section 22a of the piston and hence moves the piston to increase the restrictions in fluid flow at ports 38. By comparison, if the viscosity now increases, the flow into chamber 33 through passage 35 decreases and the pressure drop across orifice 34 correspondingly decreases. This means a decrease in the fluid pressure in chamber 33 and a correspondingly lesser force applied to piston 22 at the area of shoulder 27, allowing spring 30 to move the piston to open the ports 38 and decrease the resistance to fluid flow at this point.

The dimensions given for the regulator, including passage 35 and orifice 34, are satisfactory for a synthetic hydraulic fluid meeting Military Specification 5606 for a fluid able to withstand an ambient temperature of about 400° F.; and also hydraulic fluids meeting the requirements of later Military Specifications specifying ambient temperature of 600° F. One of the latter fluids is known as "Oronite 8200." The exact dimensions may be varied as found advisable for other fluids with different physical properties.

Since various changes in arrangement and location of the parts of the regulator as well as in exact dimensions, may be made without departing from the spirit and scope of my invention it is to be understood that the foregoing description is considered to be illustrative of rather than limitative upon the invention defined by the appended claims.

I claim:
1. In an hydraulic fluid flow regulator of the constant flow type having a body defining an internal fluid passage extending between spaced inlet and outlet openings in the body and adjustable valve means within the body regulating fluid flow therethrough, the combination comprising:

a hollow piston movable within the body and operatively connected to the valve means;

resilient means biasing the piston in a direction to adjust the valve means to maximum fluid flow;

a restricted orifice in said piston creating a fluid pressure differential in fluid flowing in one direction through the orifice and the piston, said pressure differential exerting a force on the piston to move it in opposition to said resilient means and in a direction to reduce fluid flow past said valve means;

and means defining a secondary fluid path by-passing said orifice, said last mentioned means including means creating in fluid flowing over the secondary path a fluid pressure differential between the upstream end of the path and a location along the path that is a function of the viscosity of the fluid and produces a force acting on the piston in a direction to move it in opposition to said resilient means and in a direction to reduce fluid flow past the valve means, whereby the total force on the piston is varied to compensate for changes in fluid viscosity and the total flow through the regulator is substantially constant over a wide temperature range.

2. In a fluid flow regulator of the constant flow type having a body defining an internal fluid passage extending between spaced inlet and outlet openings in the body and adjustable valve means within the body regulating fluid flow therethrough, the combination comprising:

a piston movable within said body and operatively connected to the valve means;

resilient means biasing the piston in a direction to adjust said valve means to increase the fluid flow past said valve means;

a first means carried by the piston to create a first fluid pressure differential exerting a force on a first area on the piston in a direction to move the piston in opposition to the resilient means and in a direction to adjust the valve means to decrease the fluid flow past the valve means, said first means varying the magnitude of the first force as a function of the rate of fluid flow through said means;

and a second means to create a second fluid pressure differential exerting a force on a second area on the piston in opposition to the resilient means and in a direction to adjust the valve means to decrease the fluid flow past the valve means, said second means varying the magnitude of the second force as a function of the viscosity of the fluid flowing through the regulator, constructed so that the first and second forces combine to position the piston and valve means to maintain substantially constant flow through the regulator.

3. In a fluid flow regulator the combination as in claim 2 in which the first and second means creating fluid pressure differentials include means dividing the total flow through the regulator into separate portions and said first and second means operate in parallel on said separate portions of the total fluid flow, and means combining said separate portions of the fluid flow after passing through said first and second means.

4. In a fluid flow regulator as claimed in claim 3, the combination in which the first means creating a fluid pressure differential passes a major portion of the total flow.

5. In a fluid flow regulator as claimed in claim 2, the combination in which the first and second means creating fluid pressure differentials each include an orifice of a constant cross-sectional area.

6. In a fluid flow regulator as claimed in claim 2, the combination in which the second means creating a fluid pressure differential includes two orifices disposed in series with the second area on the piston located to be exposed to fluid pressure existing between the two orifices.

7. An hydraulic fluid flow regulator, comprising:

a body having a fluid passage extending therethrough between spaced fluid inlet and outlet openings, said passage including a differential bore having a large diameter section and a smaller diameter section upstream from the large diameter section with an annular surface at the junction of the two sections, said annular surface facing axially downstream;

a piston slidable within the body bore and having a longitudinally extending fluid passage through the piston;

said piston having a small diameter section providing a first external area facing axially upstream toward the body inlet and subject to pressure of fluid upstream from the piston and a larger diameter portion providing a second external area also facing axially upstream, said second area opposing and spaced from said annular surface on the body to define therebetween an annular chamber;

means at one end of the piston creating a fluid pressure differential between said upstream fluid acting on said first area and fluid in said longitudinal passage;

a first restricted passage in the piston extending between the longitudinal passage in the piston and the annular chamber to create a pressure drop therebetween and a second restricted passage extending between the annular chamber and the fluid upstream from the piston to create a pressure drop therebetween;

resilient means biasing the piston in opposition to said fluid pressure differential;

and valve means regulating fluid flow through said regulator and responsive to movement of the piston in response to a change in the total force on the piston exerted by said fluid pressure on said first and second areas on the piston.

8. An hydraulic flow regulator as in claim 7 in which the first passage has the flow charactersitics of an orifice and flow rates therethrough are relatively unaffected by viscosity changes, and the second passage has one dimension relatively small whereby flow rates through the passage are changed greatly by changes in viscosity.

9. An hydraulic flow regulator as in claim 7 in which the first passage is a circular opening of short length and the second passage is an annular spacing between the piston and the body.

10. An hydraulic fluid flow regulator, comprising a hollow body having a fluid passage extending therethrough between spaced fluid inlet and outlet openings and including two sections of different diameters with an annular surface at the junction of the two sections, said surface facing axially downstream;

a hollow piston member slidable within the body and having a central longitudinally extending fluid passage defining a primary flow path within the regulator;

means at one end of the piston creating a fluid pressure differential between fluid in the body upstream from the piston and fluid within the piston that exerts a force on a first area on the piston urging the piston in the direction of fluid flow;

resilient means biasing the piston in opposition to said fluid pressure differential;

valve means regulating total fluid flow through said regulator in response to movement of the piston;

means defining a secondary fluid path within the regulator for limited fluid flow of a part of said fluid outside at least a part of the piston, the last mentioned means including a first and a second orifice means in series, the first orifice means regulating flow over said secondary path as a function of viscosity of the fluid;

and a second area on and externally of the piston facing axially of the piston in the same direction as said first area and opposing the annular surface on the body, said second area being downstream from said first orifice means and exposed to pressure of fluid in said secondary path at a position between said first and second orifice means that exerts on the piston a variable force in the same direction as said first mentioned force and which is a function of fluid flow over said secondary path.

11. An hydraulic fluid flow regulator as in claim 10 in which the secondary path extends between points upstream and downstream respectively of said means at one end of the piston creating a pressure differential.

12. An hydraulic fluid flow regulator as in claim 10 in which the secondary path includes a narrow passage having the flow characteristics and through which flow rates are greatly affected by changes in viscosity of the fluid.

13. An hydraulic fluid flow regulator as in claim 12 in which the narrow pasasge is defined by annular clearance between a portion of the piston and the surrounding wall of the body.

References Cited in the file of this patent

UNITED STATES PATENTS

| | | |
|---|---|---|
| 1,871,287 | Whittaker | Aug. 9, 1932 |
| 1,879,197 | Greenwald | Sept. 27, 1932 |
| 2,646,078 | Adams | July 21, 1953 |
| 2,845,086 | Waterman | July 29, 1958 |
| 2,845,087 | Thomas | July 29, 1958 |
| 2,872,939 | Terry | Feb. 10, 1959 |
| 2,917,074 | Terry | Dec. 15, 1959 |
| 2,984,261 | Kates | May 16, 1961 |
| 3,015,341 | Hedland | Jan. 2, 1962 |

FOREIGN PATENTS

| | | |
|---|---|---|
| 721,031 | Great Britain | Dec. 29, 1954 |